(12) United States Patent
Chalaud

(10) Patent No.: US 9,909,498 B2
(45) Date of Patent: Mar. 6, 2018

(54) VARIABLE GEOMETRIES FLUID SUPPLY CIRCUIT FOR A TURBOMACHINE WITHOUT VOLUMETRIC PUMP

(71) Applicant: SAFRAN AIRCRAFT ENGINES, Paris (FR)

(72) Inventor: Sebastien Chalaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/306,936

(22) PCT Filed: Apr. 27, 2015

(86) PCT No.: PCT/FR2015/051130
§ 371 (c)(1),
(2) Date: Oct. 26, 2016

(87) PCT Pub. No.: WO2015/166177
PCT Pub. Date: Nov. 5, 2015

(65) Prior Publication Data
US 2017/0051671 A1   Feb. 23, 2017

(30) Foreign Application Priority Data

Apr. 28, 2014  (FR) ...................................... 14 53819
Apr. 28, 2014  (FR) ...................................... 14 53820

(51) Int. Cl.
*F02C 7/06*   (2006.01)
*F01D 25/22*  (2006.01)
(Continued)

(52) U.S. Cl.
CPC ................ *F02C 7/06* (2013.01); *F01D 25/20* (2013.01); *F01D 25/22* (2013.01); *F02C 7/22* (2013.01);
(Continued)

(58) Field of Classification Search
CPC .. F02C 7/236; F02C 7/22; F02C 7/222; F02C 7/36; F02C 9/00; F02C 9/263; F02C 9/36;
(Continued)

(56) References Cited

U.S. PATENT DOCUMENTS 5,116,362 A * 5/1992 Arline ...................... F02C 7/236
                                                      417/203
6,810,674 B2 * 11/2004 Clements ................ F02C 9/263
                                                      60/39.281
(Continued)

FOREIGN PATENT DOCUMENTS

| EP | 2 088 302 A2 | 8/2009 |
| EP | 2 093 400 A2 | 8/2009 |
| FR | 2 882 095 A1 | 8/2006 |

OTHER PUBLICATIONS

U.S. Appl. No. 14/717,702, filed May 20, 2015, US-2015-0337734-A1, Sebastien Chalaud.
(Continued)

*Primary Examiner* — Pascal M Bui Pho
*Assistant Examiner* — Thuyhang Nguyen
(74) *Attorney, Agent, or Firm* — Oblon, McClelland, Maier & Neustadt, L.L.P.

(57) ABSTRACT

A system for supplying a turbomachine with fluid, the supply system including a low-pressure pumping unit intended to increase the pressure of the fluid flowing toward a downstream circuit. The downstream circuit divides at an inlet node, situated between the low-pressure pumping unit and the high-pressure volumetric pump, into a circuit supplying an injection system and a variable geometries supply circuit. The circuit supplying the injection system includes a high-pressure volumetric pump. The variable geometries supply circuit is configured to convey the fluid toward variable geometry from the inlet node to an outlet node
(Continued)

connecting the variable geometries supply circuit to the upstream circuit between two pumps of the low-pressure pumping unit.

12 Claims, 4 Drawing Sheets

(51) Int. Cl.

| | | |
|---|---|---|
| *F02C 9/36* | (2006.01) | |
| *F02C 7/36* | (2006.01) | |
| *F01D 25/20* | (2006.01) | |
| *F02C 9/26* | (2006.01) | |
| *F02C 7/22* | (2006.01) | |
| *F02C 7/236* | (2006.01) | |

(52) U.S. Cl.
CPC .............. *F02C 7/222* (2013.01); *F02C 7/236* (2013.01); *F02C 7/36* (2013.01); *F02C 9/263* (2013.01); *F02C 9/36* (2013.01); *F05D 2260/406* (2013.01); *F05D 2260/40311* (2013.01); *F05D 2270/52* (2013.01); *Y02T 50/671* (2013.01)

(58) Field of Classification Search
CPC . F02C 9/26; F01D 25/20; F01D 25/22; F01D 25/18
See application file for complete search history.

(56) References Cited

U.S. PATENT DOCUMENTS

| | | | | |
|---|---|---|---|---|
| 7,216,487 | B2* | 5/2007 | Parsons | F02C 9/30 60/39.281 |
| 8,256,222 | B2* | 9/2012 | Mahoney | F02C 7/222 123/495 |
| 8,286,432 | B2* | 10/2012 | Anson | F02C 7/22 60/39.281 |
| 9,021,869 | B2 | 5/2015 | Chalaud | |
| 9,394,832 | B2* | 7/2016 | Aurousseau | F02C 7/14 |
| 2009/0199823 | A1 | 8/2009 | Mahoney et al. | |
| 2009/0211558 | A1 | 8/2009 | Anson et al. | |
| 2010/0126136 | A1 | 5/2010 | Anson | |
| 2011/0139123 | A1 | 6/2011 | Brocard et al. | |
| 2012/0204532 | A1 | 8/2012 | Potel et al. | |

OTHER PUBLICATIONS

U.S. Appl. No. 14/912,523, filed Feb. 17, 2016, US-2016-0201919-A1, Sebastien Chalaud.
International Search Report dated Aug. 19, 2015 in PCT/FR15/051130 Filed Apr. 27, 2015.
French Search Report dated Jan. 15, 2015 in French Application No. 14 53820 Filed Apr. 28, 2014.
French Search Report dated Jan. 14, 2015 in French Application No. 14 538 19 Filed Apr. 28, 2014.

* cited by examiner

VARIABLE GEOMETRIES FLUID SUPPLY CIRCUIT FOR A TURBOMACHINE WITHOUT VOLUMETRIC PUMP

TECHNICAL FIELD

The invention relates to the general technical field of systems for supplying a turbomachine with fluid, in particular with lubricant or with fuel. More precisely, the invention relates to a system for supplying with fluid a combustion chamber of a turbomachine as well as a variable geometries turbomachine.

PRIOR ART

FIG. 1 shows a system for supplying 10 a turbomachine 1 with fuel, according to a known design of prior art. The system for supplying 1 comprises a low-pressure pump 11 configured to increase the pressure of the fuel flowing toward a hydraulic resistance 104. The low-pressure pump 11 is in particular a centrifugal pump. The fluid downstream of the low-pressure pump 11 then flows in the direction of a high-pressure volumetric pump 102.

The high-pressure volumetric pump 102 is intended to supply with fluid at a constant flow rate a variable geometries 54 supply circuit 50 as well as a fuel supply circuit 60 of a combustion chamber 2.

The variable geometries 54 supply circuit 50 is designed to convey fuel from an inlet node E separating the variable geometries 54 supply circuit 50 and the fuel supply circuit of the combustion chamber 2, to an outlet node C situated between the low-pressure pump 11 and the high-pressure volumetric pump 102. This variable geometries 54 supply circuit 50 is intended to supply the variable geometries 54 with variable hydraulic power.

The fuel supply circuit 60 of the combustion chamber 2 comprises a device for metering fuel 64 configured to regulate the flow rate of fuel through a supply duct 68 and intended for injection systems 62 of the combustion chamber 2. To do this, the device for metering fuel 64 is intended to allow an excess amount of fuel to flow through a recirculation loop of fluid 610 from a first node A situated downstream of the inlet node E to the outlet node C.

However, this excess fluid circulating in the recirculation loop of fluid 610 generates substantial thermal heat dissipation in the system for supplying 10. More generally, the thermal power dissipated in the system for supplying 10 of FIG. 1 is high. This results in a decrease in the overall performance of a turbomachine 1 that comprises the system for supplying 10.

DESCRIPTION OF THE INVENTION

The invention aims to resolve at least partially the problems encountered in the solutions of prior art.

In this respect, the invention has for object a system for supplying a turbomachine with fluid, with the system for supplying comprising an upstream circuit and a downstream circuit connected to the upstream circuit, the upstream circuit comprising a low-pressure pumping unit, intended to increase the pressure of the fluid flowing toward a downstream circuit and which comprises a first centrifugal pump, the downstream circuit divides at an inlet node into a circuit supplying an injection system for a combustion chamber and into another supply circuit configured to convey fluid to variable geometries, wherein the supply circuit of the injection system comprises a high-pressure volumetric pump.

According to the invention, the low-pressure pumping unit is devoid of a volumetric pump and comprises at least one other centrifugal pump in series with the first centrifugal pump, the inlet node is situated between the low-pressure pumping unit and the high-pressure volumetric pump, and the variable geometries supply circuit is connected to the upstream circuit at an outlet node situated between two pumps of the low-pressure pumping unit.

The increase in the pressure of the fluid in the upstream circuit is used both to supply the variable geometries supply circuit and the supply circuit of the injection system, while the needs for the flow rate of fluid of the injection system and in hydraulic pressure of the variable geometries are treated separately by an architecture for regulating the supply with fluid. In particular, the variable geometries are not supplied with fluid by the high-pressure volumetric pump. The total thermal power dissipated in the system for supplying is then reduced.

The plurality of centrifugal pumps is intended to further increase the pressure of the fluid that passes through them, while still limiting the encumbrance and the dissipation of thermal energy of the low-pressure pumping unit. The increase in the power supplied by the low-pressure pumping unit is in particular less substantial than the drop in the power supplied by the volumetric pump that results.

The fluid in the system for supplying is in particular a lubricant, typically oil or fuel.

The invention can optionally comprise one or several of the following characteristics individually or combined together or not.

According to an advantageous embodiment, the outlet node is situated between the first centrifugal pump and a second centrifugal pump of the low-pressure pumping unit.

Preferably, the low-pressure pumping unit is constituted of a plurality of centrifugal pumps in series. The low-pressure pumping unit preferably comprises three, four or five centrifugal pumps.

According to a particularity of an embodiment, the high-pressure pump is a volumetric gear pump configured to be mechanically driven by a turbomachine gearbox.

The gearbox preferably transmits a torque transmitted by a high-pressure shaft of a turbomachine, in order to mechanically drive the high-pressure volumetric pump. The high-pressure volumetric pump is in particular situated inside an accessory relay box, also known as an "Accessory Gear Box" or "AGB". The high-pressure volumetric pump is then from a technology that is robust and proven, which requires limited forces for development and certification.

When the high-pressure pump is a volumetric gear pump, the supply circuit of the injection system preferably comprises a device for metering fluid and an injection system, with the device for metering fluid being configured to regulate the flow rate in the direction of the injection system and/or in the direction of a recirculation loop of the fluid configured to convey the fluid upstream of the high-pressure pump.

The recirculation loop of the fluid is in particular configured to convey fluid coming from the metering device to a removal node situated between the low-pressure pumping unit and the high-pressure pump. The removal node connects for example the supply circuit of the injection system to the upstream circuit.

The removal node is located as close as possible to the inlet of the high-pressure volumetric pump, in order to limit the thermal power dissipated in the recirculation loop of the fluid. However, the removal node is generally located upstream of a hydraulic resistance comprising for example a filter and/or a flow meter.

The system for supplying preferably comprising a hydraulic resistance between the low-pressure pumping unit and the high-pressure pump, with the hydraulic resistance comprising at least one of the following elements: an exchanger, a filter, a cut-off valve or a flow meter.

According to another particularity of an embodiment, the high-pressure volumetric pump is an electric pump commanded by an electronic system for regulating the turbomachine.

Moreover, using an electric volumetric pump makes it possible to limit the mass, the encumbrance and the power dissipated in the system for supplying. More precisely, the relatively low power supplied by the electric volumetric pump makes it possible to command it without adding to the turbomachine massive power electronics. Furthermore, the recirculation loop and the metering device can be suppressed from the system for supplying. Finally, it is possible to adjust the flow rate delivered by the electric volumic pump, in such a way as to limit the thermal losses associated with the circulation of an excess amount of fluid in the system for supplying.

The electric volumetric pump is more preferably commanded by a full-authority electronic control module via an electronic control module. The full-authority electronic control module, the electronic control module and the electric volumetric pump then provide the command of the flow rate of fluid flowing in the direction of the combustion chamber.

In this configuration, the supply circuit of the injection system is more preferably devoid of a metering device of fluid configured to regulate the flow rate in the direction of the injection system.

According to another advantageous embodiment, variable geometries supply circuit is devoid of a volumetric pump.

Advantageously, the upstream circuit is devoid of a volumetric pump.

According to another particularity of an embodiment, the variable geometries supply circuit comprises at least one hydraulic actuator of variable geometries.

Advantageously, the variable geometries supply circuit comprises a set of complementary pumping that comprises one or several centrifugal pumps. Preferably, the set of complementary pumping is constituted of one or several centrifugal pumps.

Alternatively, the variable geometries supply circuit is devoid of a pump. In this case, the pressure of the fluid supplying each variable geometry is generated lastly by the low-pressure pumping unit.

The invention also relates to a turbomachine comprising a system for supplying with fluid such as defined hereinabove.

The invention also relates to a turbomachine comprising a differential gearbox configured to drive in rotation at least one propeller and intended to be supplied with lubricant by the system for supplying such as defined hereinabove. In this case, the turbomachine is for example a turbomachine with a set of non-ducted contra-rotating propellers, also known under the name "Open Rotor".

BRIEF DESCRIPTION OF THE DRAWINGS

This invention shall be better understood when reading the description of embodiments, given solely for the purposes of information and in no way limiting, in reference to the annexed drawings wherein.

DETAILED EXPOSURE OF PARTICULAR EMBODIMENTS

Identical, similar or equivalent parts of the various figures bear the same numerical references in such a way as to facilitate the passing from one figure to another.

Figure 2:
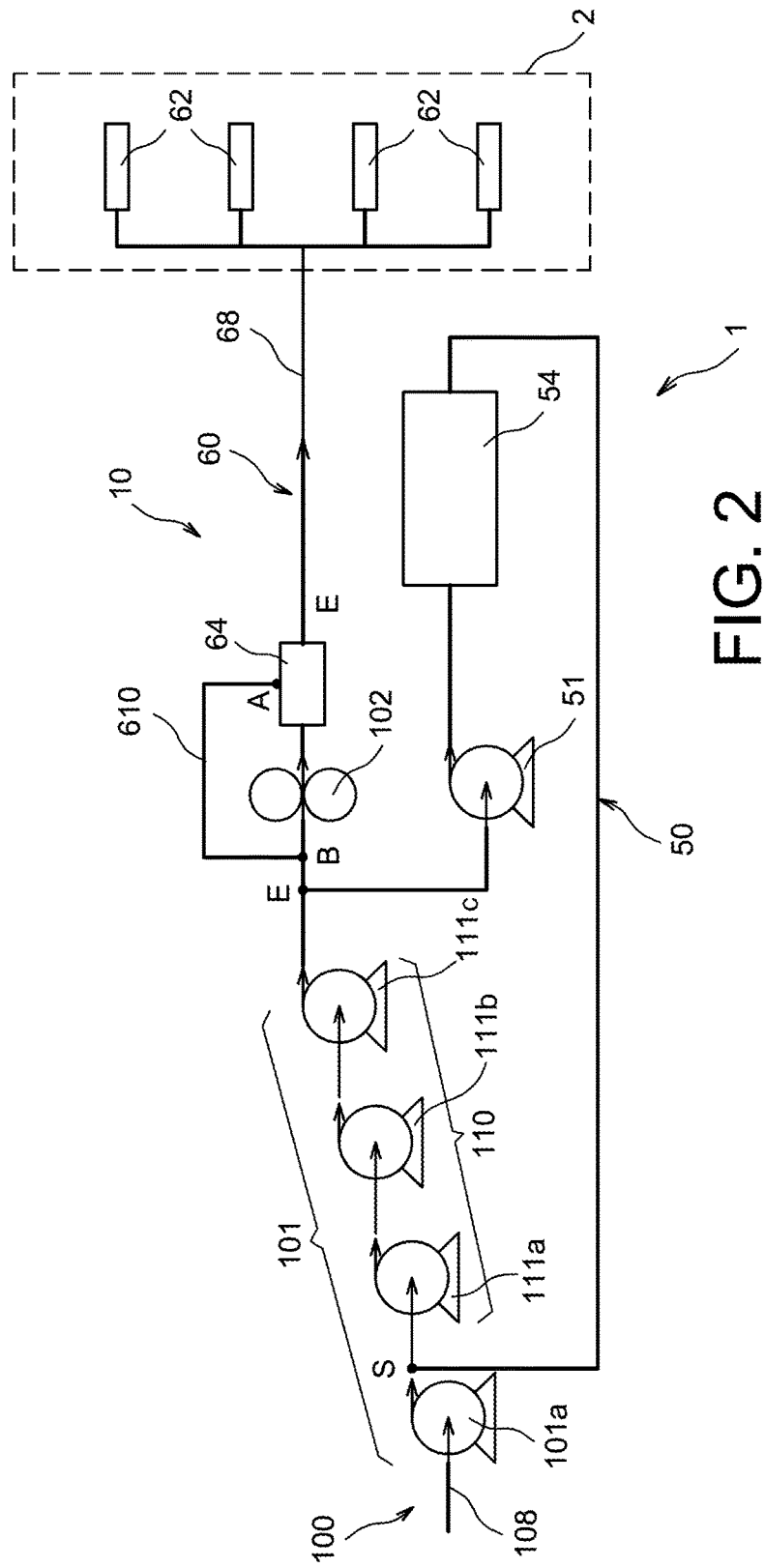
FIG. 2 is a partial diagrammatical view of a system for supplying a turbomachine with fluid, according to a first embodiment of the invention.

FIG. 2 shows a system for supplying 10 an aircraft turbomachine 1 with fluid. In the embodiment described, the fluid is fuel. However, when the turbomachine 1 comprises a differential gearbox (not shown) configured to drive in rotation at least one propeller, the fluid can also be lubricant, typically oil.

The turbomachine 1 comprises the system for supplying 10, one or several variable geometries 54 and a combustion chamber 2. These variable geometries 54 are equipment of the turbomachine 1 that require taking hydraulic power in order to operate. The variable geometries 54 can be of various natures, for example a cylinder, a servo valve, an adjustable compressor bleed valve, a transient compressor bleed valve, and/or a valve for commanding the air flow rate for a system for commanding the play at the top of the rotor blades for a low-pressure turbine or high-pressure turbine.

The combustion chamber 2 is supplied with fuel by a plurality of fuel injectors cooperating with the corresponding fuel injector systems 62.

The system for supplying 10 comprises an upstream circuit 100 and a downstream circuit 50, 60. The downstream circuit 50, 60 is connected to the upstream circuit 100 and situated downstream of the upstream circuit 100. The terms "upstream" and "downstream" are defined in reference to the general direction of flow of the flow in the system for supplying 10 in the direction of the combustion chamber 2.

The upstream circuit 100 comprises a low-pressure pumping unit 101 that increases the pressure of the fuel flowing toward a downstream circuit 50, 60. The low-pressure pumping unit 101 increases the pressure of the fuel, in such a way as to limit/prevent the risks of cavitation inside a high-pressure pump 102 that delivers a constant flow rate of fuel according to the engine rotation speed.

Figure 1:
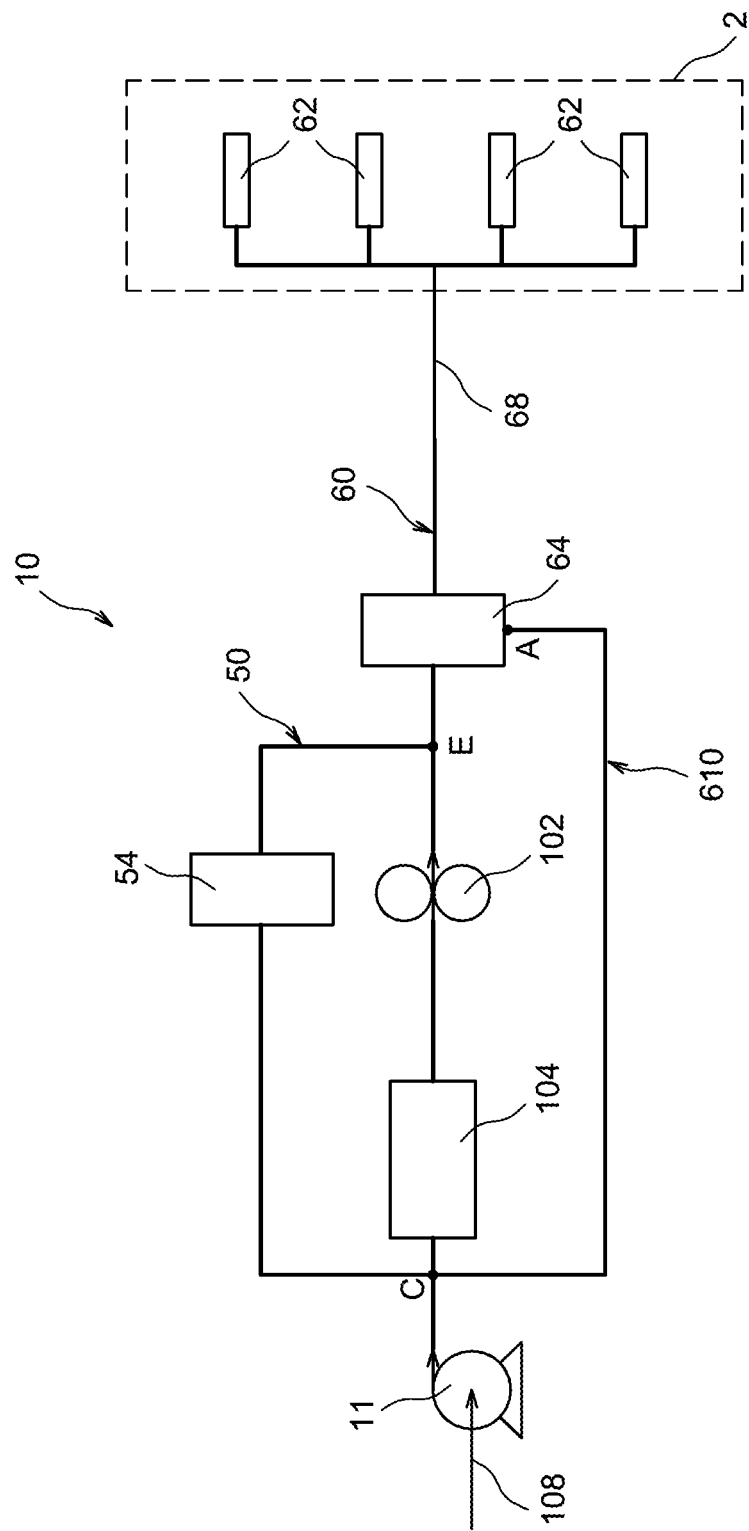
FIG. 1 is a partial diagrammatical view of a system for supplying an aircraft turbomachine with fuel, according to a known design of prior art.

The upstream circuit 100 can include a hydraulic resistance 104, such as that shown in FIG. 1, between the low-pressure pumping unit 101 and the downstream circuit 50, 60 or between two stages of the low-pressure pumping unit 101. The term "hydraulic resistance" is used to define in this document, by analogy with the field of electricity, the magnitude resulting from the relationship between the difference in pressure of fluid between the inlet and the outlet of an element of the system for supplying on the flow rate of fluid passing through the element. By metonymy and still by analogy with the field of electricity, the term "hydraulic resistance" is also used to designate an element of the system for supplying characterised by this magnitude. The hydraulic resistance 104 of the upstream circuit 100 comprises for example an exchanger, a fuel filter, a cut-off valve and/or a flow meter.

The downstream circuit 50, 60 comprises a supply circuit 60 of the injection systems 62 for a combustion chamber 2, and a variable geometries supply circuit 50. The variable geometries supply circuit 50 and the supply circuit 60 of the injection systems 62 are separated at the level of an inlet node E located downstream of the low-pressure pumping unit 101.

The variable geometries supply circuit 50 is configured to convey the fluid that passes through the variable geometries 54, from the inlet node E to an outlet node S that connects the variable geometries supply circuit 50 to the upstream circuit 100.

Figure 3:
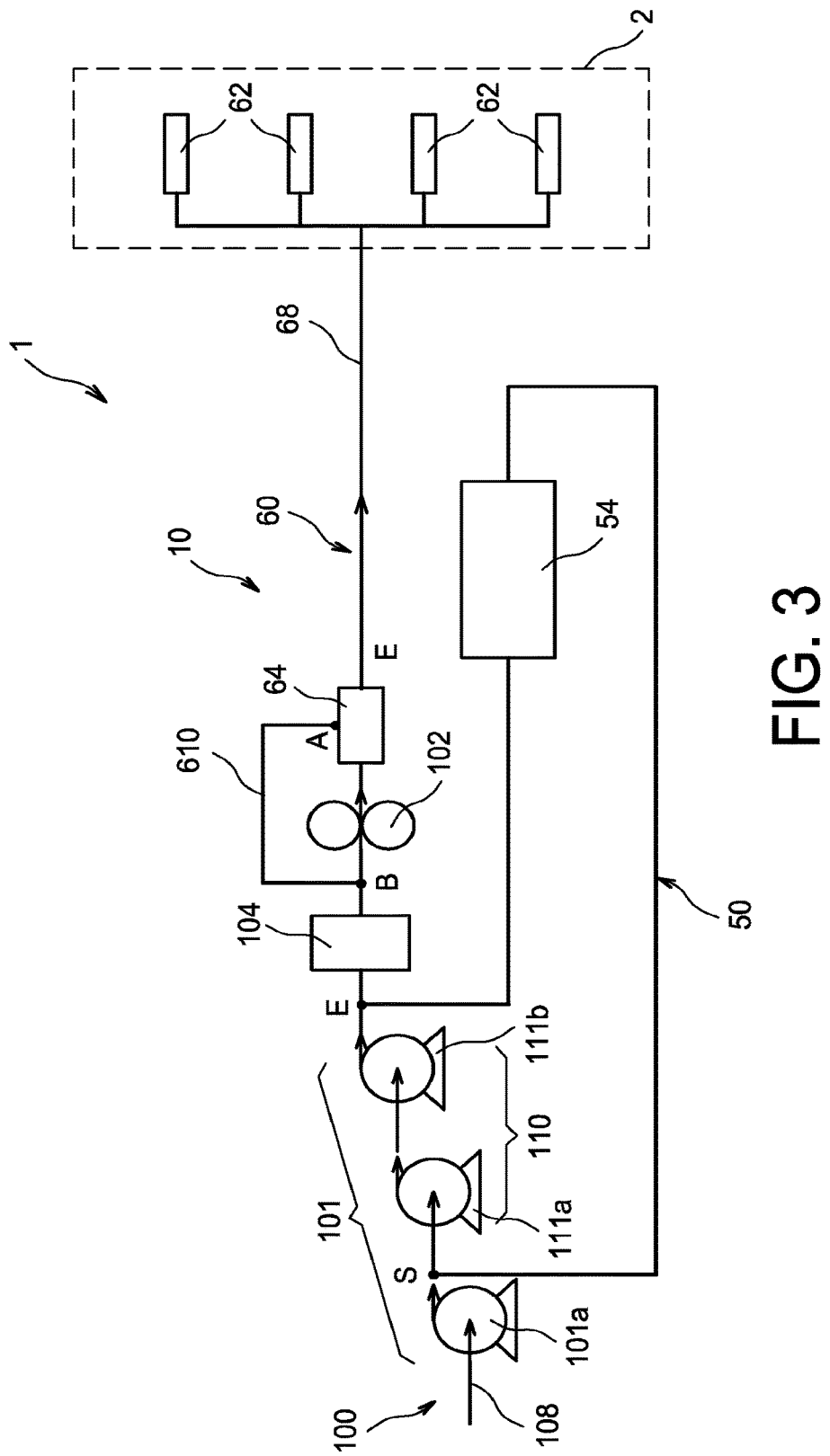
FIG. 3 is a partial diagrammatical view of a system for supplying a turbomachine with fluid, according to a second embodiment of the invention.
Figure 4:
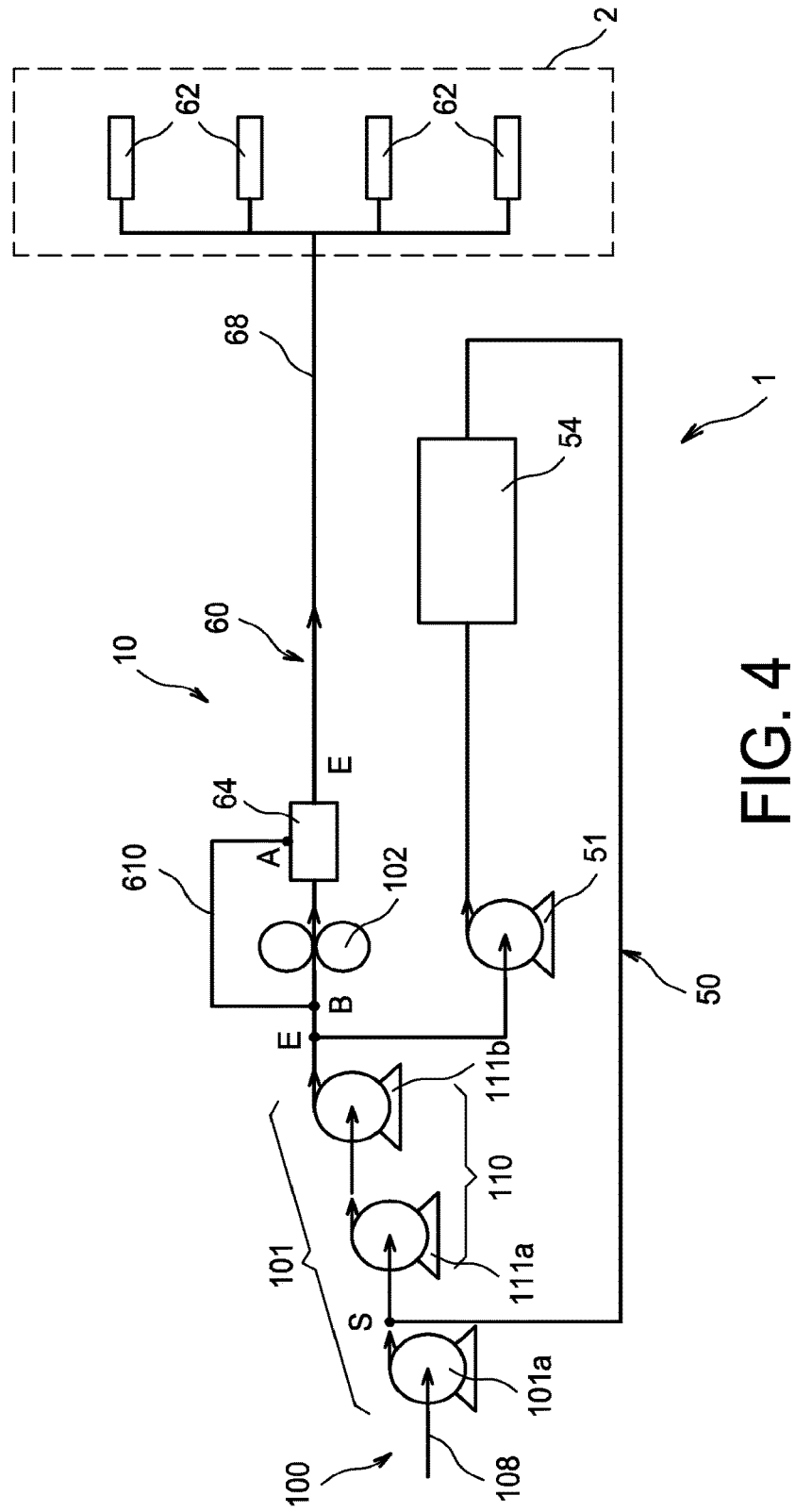
FIG. 4 is a partial diagrammatical view of a system for supplying a turbomachine with fluid, according to a third embodiment of the invention.

The systems for supplying 10 shown in FIGS. 2 to 4 can be distinguished mainly from the one of FIG. 1 in that the upstream circuit 100 is devoid of a high-pressure volumetric pump, in that the low-pressure pumping unit 101 is constituted of a plurality of centrifugal pumps 110a, 111a, 111b, and in that the downstream circuit 50, 60 comprises a high-pressure volumetric pump 102.

The low-pressure pumping unit 101, which can be seen in FIGS. 2 to 4, further increases the pressure of the fluid in the direction of the high-pressure pump 102 with respect to the low-pressure centrifugal pump 11 of FIG. 1. The high-pressure volumetric pump 102 of FIG. 2 then supplies an increase in the pressure of the fluid that is all the more so low. This results in an overall reduction in the thermal losses of the system for supplying 10.

The displacement of the high-pressure volumetric pump 102 from the upstream circuit 100 to the supply circuit 60 of the injection systems 62 makes it possible to decrease the flow rate of fuel supplied by the volumetric pump 102. The overall thermal losses of the system for supplying 10 are still reduced. The variable geometries supply circuit 50 is devoid of a volumetric pump.

The low-pressure pumping unit 101 of FIGS. 2 to 4 comprises a plurality of centrifugal pumps 101a, 111a, 111b. As such, it should be noted that it would not have been fully satisfactory to only replace the low-pressure pump 11 of FIG. 1 with a low-pressure pump 11 of greater capacity. Indeed, the difference in pressure at the terminals of a centrifugal pump is proportional to the square of the radius of the pump. Above all, the energy efficiency of a centrifugal pump is proportional to the cube of the radius of this pump. Replacing the low-pressure pump 11 of FIG. 1 with a centrifugal low-pressure pump, configured to further increase the pressure of the fluid that passes through it, would therefore not have produced as significant advantages in terms of overall thermal balance of the system for supplying 10.

The outlet node S of the system for supplying 10 of FIGS. 2 to 4 is situated between two pumps 101a, 111a of the low-pressure pumping unit 101, in such a way as to retain a sufficient difference in pressure between the downstream of the set of complementary pumping 51 and the outlet node S and while still limiting the dissipation of thermal energy in the system for supplying 10. The system for supplying 10 of FIGS. 2 and 3 is in particular configured so that the difference in pressure between the downstream of the set of complementary pumping 51 and the outlet node S of the system for supplying of these figures is substantially identical to that of FIG. 1, during the operation of the system for supplying 10.

More precisely and in reference to the embodiment of FIGS. 2 to 4, the low-pressure pumping unit 101 comprises three centrifugal pumps 101a, 111a, 111b or four centrifugal pumps 101a, 111a, 111b, 111c mounted in series. The outlet node S is located between an upstream pumping unit 101a comprising a centrifugal pump and a downstream pumping unit 110 comprising two centrifugal pumps 111a, 111b or three centrifugal pumps 111a, 111b, 111c.

Generally, the upstream pumping unit 101a may include several centrifugal pumps and the number of centrifugal pumps of the downstream pumping unit 110 may vary, according to the needs in hydraulic power and in flow rate of the fluid of the turbomachine 1. Likewise, the pumps of the low-pressure pumping unit 101 are not necessarily identical.

Moreover, the increase in the pressure supplied by the low-pressure pumping unit 101 of FIGS. 2 to 4 with respect to the system for supplying 10 of FIG. 1 is all the more so advantageous that the needs in hydraulic pressure of the variable geometries supply circuit 50 of these systems for supplying 10 are substantially identical to those variable geometries of the system for supplying of FIG. 1.

In the embodiments of FIGS. 2 and 3, the high-pressure pump 102 is a volumetric gear pump configured to be driven mechanically by a gearbox of a turbomachine 1. The removal node B is situated between the low-pressure pumping unit 101 and the high-pressure volumetric pump 102.

The high-pressure volumetric pump 102 delivers a constant flow rate of fuel according to the engine rotation speed. The flow rate of fuel at the outlet of the high-pressure volumetric pump 102 is, in a known manner, greater than the flow rate required to supply the injection systems 62, regardless of the phase concerned of the flight of the turbomachine 1. In particular, the constant flow rate supplied by the high-pressure volumetric pump 102 is determined according to the flow rates required for the most constraining operating speeds of the turbomachine 1, i.e. the flow rates for the low speeds for example. Consequently, there is a flow rate of fluid circulating in the recirculation loop 610, which generates thermal losses. This recirculation loop 610 is situated between a first node A downstream of the inlet node E and a removal node B situated downstream of the low-pressure pumping unit 101.

The supply circuit 60 of the injection systems comprises a bleed valve and a fuel metering device which are represented by the unit 64 and which regulate the flow rate in the direction of the injection system 62. The bleed valve and the fuel metering device 64 are designed to redirect the excess fuel in the supply circuit 60 of the injection systems 62 to the upstream circuit 100 through the fuel recirculation loop 610.

The variable geometries supply circuit 50 of FIG. 2 can be distinguished from that of FIG. 3 in that it comprises a set of complementary pumping 51. The set of complementary pumping 51 makes it possible to suppress any drop in pressure coming from the suppression of the volumetric pump 102 in the upstream circuit 100, and which would not be entirely offset by the plurality of centrifugal pumps 101a, 111a and 111b of the low-pressure pumping unit 101.

The set of complementary pumping 51 makes it possible to respond to a one-off substantial need in flow rate of the variable geometries 54, for example during a displacement of the actuator hydraulic cylinder.

The set of complementary pumping 51 comprises one or several centrifugal pumps, or other types of pumps other than a volumetric pump. In the embodiment of FIG. 2, the set of complementary pumping 101 consists of a centrifugal pump.

In reference specifically to FIG. 4, the supply circuit 60 of the injection systems comprises a hydraulic resistance 69, such as a fuel filter, and a supply duct 68 of the injection systems between the hydraulic resistance 69 and the injection systems 62.

The volumetric pump 102 is electrical, which makes it possible to suppress the fuel metering device 64 that commands the flow rate in the direction of the combustion chamber 2. The recirculation loop of fuel 610 also disappears. From this stems a gain in the mass of the system for supplying 10, as well as a suppression of the thermal losses generated by the recirculation of the fuel in the recirculation loop 610.

The decrease in the power supplied by the high-pressure volumetric pump 102 makes it possible to command the electric volumetric pump 102 without having recourse to massive power electronics. Having recourse to a high-pressure electric volumetric pump 102, rather than to a more conventional volumetric gear pump driven in rotation by a turbomachine gearbox, therefore provides advantages in terms of mass, encumbrance and thermal power dissipated in the system for supplying 10.

The electric volumetric pump 102 is commanded by the full-authority electronic control module 120 of the turbomachine, also known under the name of "FADEC" or "Full Authority Digital Engine Control", via an electronic control module 122. Conventionally, the electronic control module 120 comprises an engine control unit with two symmetrical and redundant channels and with full-authority. This engine control unit is intended to take many parameters into account in order to control the flow rate delivered by the high-pressure volumetric pump 102, such as for example: a command of a pilot of an aircraft, the rotation speed of the high-pressure body of turbomachine 1 and a measuring of the flow rate in the direction of the injection systems 62 measured by a flow meter 67.

Of course, various modifications can be made by those skilled in the art to the invention that has just been described without leaving the scope of the disclosure of the invention.

The invention claimed is:

1. A system for supplying a turbomachine with fluid, comprising:
   an upstream circuit; and
   a downstream circuit connected to the upstream circuit,
   wherein the upstream circuit comprises a low-pressure pumping unit configured to increase a pressure of the fluid flowing toward the downstream circuit and which comprises a first centrifugal pump,
   wherein the downstream circuit divides at an inlet node into a supply circuit of an injection system for a combustion chamber and into a variable geometries supply circuit configured to convey fluid to variable geometries, the supply circuit of the injection system comprising a high-pressure volumetric pump,
   wherein the low-pressure pumping unit is devoid of a volumetric pump and comprises at least a second centrifugal pump in series with the first centrifugal pump, the low-pressure pumping unit comprising at least two pumps,
   wherein the inlet node is situated between the low-pressure pumping unit and the high-pressure volumetric pump, and
   wherein the variable geometries supply circuit is connected to the upstream circuit at an outlet node situated between the at least two pumps of the low-pressure pumping unit.

2. The system for supplying according to claim 1, wherein said outlet node is situated between the first centrifugal pump and the second centrifugal pump of the low-pressure pumping unit.

3. The system for supplying according to claim 1, wherein the low-pressure pumping unit comprises three, four or live centrifugal pumps in series.

4. The system for supplying according to claim 1, wherein the high-pressure volumetric pump is a gear pump configured to be mechanically driven by a turbomachine gearbox.

5. The system for supplying according to claim 4, wherein the supply circuit of the injection system comprises a fluid metering device and an injection system, and
   wherein the fluid metering device is configured to adjust a flow in at least one of a direction of the injection system and in a direction of a fluid recirculation loop configured to convey the fluid upstream of the high-pressure volumetric pump.

6. The system for supplying according to claim 1, wherein the high-pressure volumetric pump is an electric pump commanded by an electronic system for regulating the turbomachine.

7. The system for supplying according to claim 1, wherein the high-pressure volumetric pump is commanded by a full-authority electronic control module via an electronic control module.

8. The system for supplying according to claim 1, wherein the variable geometries supply circuit is devoid of a volumetric pump.

9. The system for supplying according to claim 1, wherein the upstream circuit is devoid of a volumetric pump.

10. The system for supplying according to claim 1, wherein the variable geometries supply circuit comprises at least one hydraulic actuator of variable geometries.

11. The system for supplying according to claim 1, wherein the variable geometries supply circuit comprises a set of complementary pumping comprising at least one centrifugal pump.

12. A turbomachine comprising a system for supplying the turbomachine with fluid according to claim 1.

* * * * *

UNITED STATES PATENT AND TRADEMARK OFFICE
CERTIFICATE OF CORRECTION

PATENT NO. : 9,909,498 B2
APPLICATION NO. : 15/306936
DATED : March 6, 2018
INVENTOR(S) : Sebastien Chalaud Page 1 of 1

It is certified that error appears in the above-identified patent and that said Letters Patent is hereby corrected as shown below:

In the Claims

Column 8, Line 18, change "four or live" to --four or five--.

Signed and Sealed this
Sixth Day of August, 2019

Andrei Iancu
*Director of the United States Patent and Trademark Office*